United States Patent
Braun et al.

(10) Patent No.: US 6,685,409 B2
(45) Date of Patent: Feb. 3, 2004

(54) SCREW AND CAPTIVE WORK SUPPORTING ELEMENT

(75) Inventors: Mario Braun, Mücke (DE); Wolfgang Sommer, Gemünden/Wohra (DE)

(73) Assignee: Kamax-Werke Rudolf Kellerman GmbH & Co. KG, Osterode am Harz (DE)

( * ) Notice: Subject to any disclaimer, the term of this patent is extended or adjusted under 35 U.S.C. 154(b) by 0 days.

(21) Appl. No.: 10/068,162

(22) Filed: Feb. 5, 2002

(65) Prior Publication Data

US 2002/0106258 A1 Aug. 8, 2002

(30) Foreign Application Priority Data

Feb. 8, 2001 (DE) .......................................... 101 06 093

(51) Int. Cl.$^7$ ................................................ F16B 35/04
(52) U.S. Cl. ...................................... 411/353; 411/999
(58) Field of Search ................................ 411/352, 353, 411/107, 999

(56) References Cited

U.S. PATENT DOCUMENTS 3,118,718 A * 1/1964 Babey
3,221,794 A * 12/1965 Acres
3,560,132 A * 2/1971 Gulistan
4,732,519 A * 3/1988 Wagner
6,044,536 A * 4/2000 Schneider

FOREIGN PATENT DOCUMENTS

| DE | 43 32 494 | 9/1993 |
| DE | 199 24 502 A1 | 9/1993 |

* cited by examiner

Primary Examiner—Flemming Saether
(74) Attorney, Agent, or Firm—Thomas, Kayden, Horstemeyer & Risley

(57) ABSTRACT

A connecting element includes a screw including a head and a shank. The shank has an end, and it includes a shank portion, a threaded portion and a stop element. The threaded portion has an outer diameter, and it includes a thread runout facing the head. The thread runout has an axial extension and a circumference. The shank portion has a diameter which is less than the outer diameter of the threaded portion. The stop element is produced by removing the thread runout at least over a part of the axial extension and of the circumference of the thread runout in a way that the stop element has a diameter which approximately corresponds to the outer diameter of the threaded portion. The connecting element also includes a supporting element being captively connected to the screw and including a narrowing location having a diameter which is less than the outer diameter of the threaded portion.

19 Claims, 7 Drawing Sheets

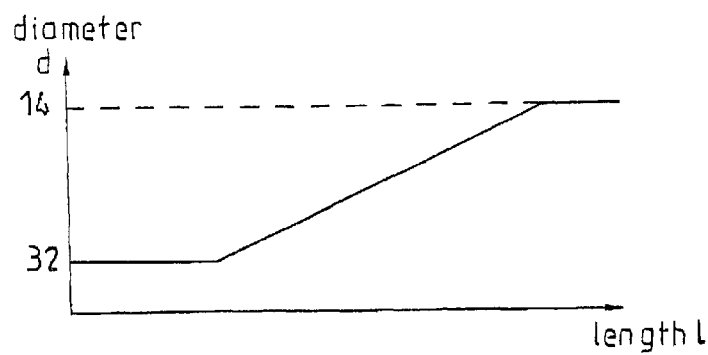
Fig. 8
(prior art)
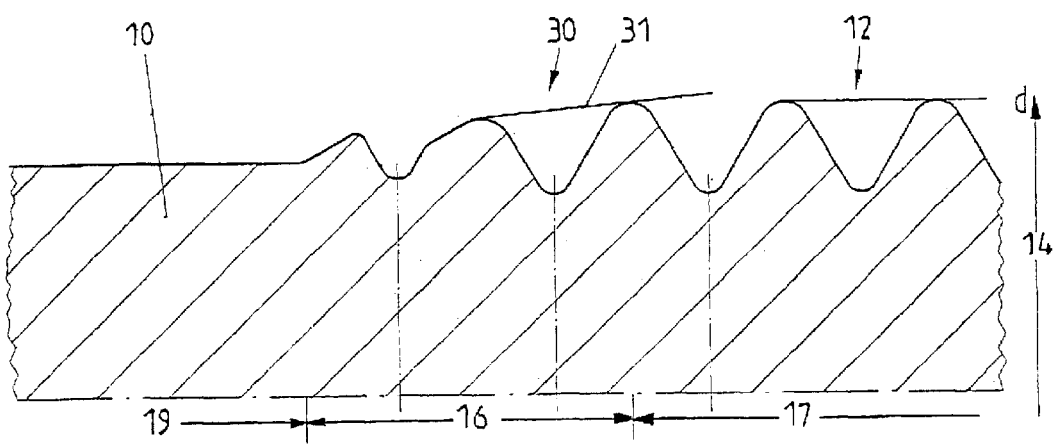

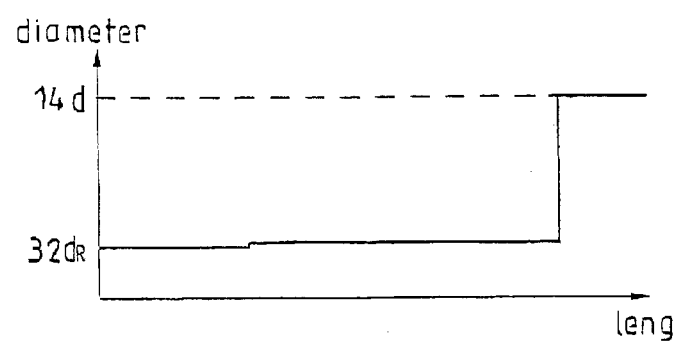
Fig. 9
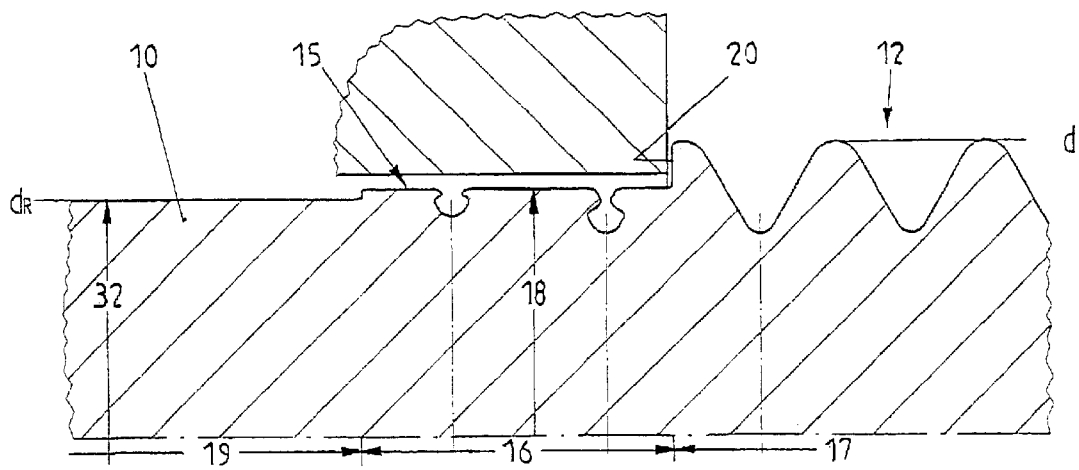

SCREW AND CAPTIVE WORK SUPPORTING ELEMENT

CROSS REFERENCE TO RELATED APPLICATIONS

This application claims the benefit of German Patent Application No. 101 06 093.9-12 entitled "Verbindungselement rnit einer Schraube und einem daran unverlierbar angeordneten Sütutzelement", filed on Feb. 8, 2001.

FIELD OF THE INVENTION

The present invention generally relates to a screw connector including a screw and a work supporting element being captively connected to the screw. More particularly, the present invention relates to a special design of the thread runout of the screw facing the head of the screw.

BACKGROUND OF THE INVENTION

Screw connectors including a screw and a work supporting element being captively connected to the screw to prevent unintentional detachment of the two elements are produced in series to attain a great pre-production level, and to simplify assembly of the screw connectors. The screw connectors serve to connect components.

A screw connector is known from German Patent Application No. 199 24 502 A1. The known screw connector that functions as a connecting element includes a screw having a head with a head Supporting surface and a shank and a support sleeve that surrounds the shank of the screw and functions as a supporting element. The shank includes a cylindrical shank portion and a threaded portion. The shank portion faces towards the head of the screw, while the threaded portion is more or less located at the free end of the shank of the screw facing away from the head. The threaded portion may also be arranged in a middle region of the shank, for example in the case of the screw at its free end including a centering element.

The support sleeve functions as a supporting element and may be designed as a bush or as a plain washer. The supporting element may also include more of such supporting elements. The supporting element includes a narrowing location having a diameter which is less than the outer diameter of the thread of the threaded portion of the screw. The narrowing location may be produced in different ways, for example by impressions being located on the circumference of the bush, or by a continuous protrusion protruding towards the inside. It is also possible to use separate elements, for example a securing ring, being located in the inner diameter of the bush. When a plain washer is used as the supporting element, the bore of the plain washer forms the narrowing location. In this way, the bore forms a continuous enlarging element protruding towards the inside.

The shank portion of the screw has a comparatively reduced diameter—meaning a diameter which is less than the outer diameter of the thread being located on the threaded portion. The reduced diameter of the shank portion may correspond to the rolling diameter of the screw during its manufacture.

When a thread is to be produced on the shank of a screw—especially by rolling—this is only possible by producing a thread runout facing the head of the screw. The diameter of the thread convolution (or of the thread convolutions) increases in the region of the thread runout facing the head of the screw from the rolling diameter, for example, to the outer diameter of the thread in the threaded portion being located adjacent to the runout. Standardization of the thread runout differentiates between a "standard case" and a so called "short design". In the standard case, the thread convolution extends about 2.5 rotations of the screw—meaning about 900°—while changing its outer diameter. The short design of the thread runout relates to 1.25 rotations—meaning 450°. Even shorter thread runouts would be theoretically possible, but their production is expensive due to comparatively reduced usable times of the tools for rolling these threads.

In the prior art, in the region of each thread runout—no matter whether in the standard case or in the short design case—there is a conical surrounding cone at the screw, the surrounding cone contacting the narrowing location of the supporting element. When one imagines winding down the thread convolution of the thread runout, one attains a very long inclined plane with a slowly increasing angle of inclination. The surrounding cone and the inclined plane, respectively, have the effect of the danger of the supporting element getting clamped in the region of the thread runout.

Such known connecting elements are especially used as bulk goods at assembly stations. Usually, a feeding apparatus and a conveying apparatus, respectively, are prearranged to the assembly station, the feeding apparatus ensuring that the connecting elements are located in a row, for example. Such conveying apparatuses often use vibration drives. Using vibration drives, there is the danger of the supporting element being vibrated in a way that it is located on the screw too fixedly such that it can no longer be assembled in the assembly station. Even in case such known connecting elements are separately fed to reach their desired place of application, there also is the danger of—at least in some of the connecting elements—the supporting element in the region of the thread runout having a clamped seat at the screw during transportation of the known connecting elements as bulk goods. These disadvantages do not only occur when the narrowing locations are designed as impressions being located at the supporting element in a spaced apart manner, but also when the narrowing locations are designed to be continuous over the circumference of the supporting element. In case of using local impressions, there is the danger of these impressions being vibrated and clamped in the position in which they engage two adjacent portions of the thread convolution in the region of the thread runout facing the head of the screw.

SUMMARY OF THE INVENTION

The present invention relates to a screw connector that functions as a connecting element, including a screw including a head and a shank and a supporting element that surrounds the shank of the screw and functions as a work supporting element.

The shank of the screw has an end remote from the head, and the shank includes a shank portion adjacent the head, a threaded portion more or less remote from the head and an increasing element formed as an inclined step that functions as a stop between the shank portion and the threaded portion. It is to be understood that the thread of a screw always has two ends or runouts, one of them facing the free end of the screw, and the other one facing the head of the screw. The present invention relates to the design of the end of the thread facing the head of the screw.

The threaded portion of the screw has an outer diameter, and it includes a thread runout facing the head of the screw and extending from the thread to the shank portion of the screw. The thread runout has an axial extension and a circumference. The shank portion has a diameter which is less than the outer diameter of the threaded portion. The step is produced by removing at least a portion of the thread runout at least over a part of the axial extension and of the circumference of the thread runout in a way that the step has a an outer diameter which approximately corresponds to the outer diameter of the threaded portion.

The screw connector also includes a work supporting element that is captively connected to the screw and includes a narrowing location facing the shank of the screw having a diameter which is less than the outer diameter of the threaded portion of the screw.

The present invention also relates to a connecting unit including a screw including a head and a shank. The shank has an end, and it includes a shank portion, a threaded portion and a stop element. The threaded portion has an outer diameter, and it includes a thread end facing the head. The thread end has an axial extension and a circumference. The shank portion has a diameter which is less than the outer diameter of the threaded portion. The stop element is produced by removing the thread runout at least over a part of the axial extension and of the circumference of the thread runout in a way that the stop element is formed with has a an outer diameter which approximately corresponds to the outer diameter of the threaded portion, and that the screw in the region of the removed thread end has a surrounding diameter which has an approximately cylindrical shape and which is less than the diameter of the narrowing location.

The connecting unit further includes a work supporting element being connected to the screw and the supporting element includes a narrowing location having a diameter which is less than the outer diameter of the threaded portion. The narrowing location is designed and arranged to cooperate with the stop element to prevent unintentional removal of the supporting element from the screw.

With the novel connecting element, the tendency of clamping effects acting between the screw and the supporting element are substantially reduced, especially when automatically conveying the connecting element. Usually, the screw and the supporting element are made of metal. However, different materials, for example plastic material, may also be used for the novel connecting element.

In the novel connecting element, the thread runout, or—in other words—the end of the thread facing the head of the screw, is at least partially removed. It may also be completely removed. In this way, the surrounding cone shape of the thread runout in this region is eliminated, and the thread runout is deformed to have the shape of a surrounding cylinder. It is desired to produce an increasing element shaped as a step or a stop at the beginning of the threaded portion facing the head of the screw. The novel inclination element serves as a stop for the narrowing location being located at the supporting element. The stop is effective as it prevents movement of the supporting element about the shank and threads in an axial direction off the end of the screw, and possibly also in a tangential direction. In the region of the step, the diameter of the screw increases in a tangential direction. However, this increase in diameter takes place over a comparatively shorter length than it is known in the prior art. For example, the increase in the outer diameter of the thread convolution at the intersecting surface of the step with the flank of the thread convolution only extends over a fraction of one rotation of the screw.

In this way, there is a sudden transition between the shank portion and the threaded portion of the screw in an axial direction and in a tangential direction This sudden transition strongly reduces and eliminates, the tendency of the support sleeve getting clamped in the threads of at the screw. This especially applies when the support sleeve is located at the screw to be rotatable about the shank of the screw.

The thread runout may be entirely or partly reduced by removing material or without removing material. Especially, it is possible to produce the novel runout by rolling. In this way, the outer diameter of the thread runout is reduced by rolling it flat. Usually, there is a remainder of the thread runout. However, the remainder is at least approximately surrounded by the imaginary surrounding cylinder. However, the remainder of the thread runout is small and cannot cause clamping of the supporting elements during movement of the supporting element with respect to the screw.

It is especially preferred to design the screw such that it has a surrounding diameter which is axially cylindrical in the region of the thread runout facing the head of the screw. However, the screw may also be designed in a way that the thread runout ends in a slightly conical surrounding diameter since different amounts of material have to be rolled down over the axial length of the thread runout. It is desired to chose the design such that there is no clamping contact with respect to the narrow location or to the narrow locations of the supporting element. The beginning of the thread (or in other words, the end of the thread facing the head of the screw) includes a contact surface or a supporting surface in the form of a step. The step substantially extends in a radial direction, it is substantially effective in an axial direction, and it only covers part of the circumference of the screw. The step also has an arcuate surface extending in a tangential direction. However, this does not have a negative effect in combination with the design of the supporting element. This is especially preferred when the surrounding diameter or the surrounding cylinder of the supporting element is substantially less than the diameter of the narrow location. It is preferred to chose an arrangement allowing for increased play or clearance to securely prevent the tendency of clamping effects. On the other hand, it is preferred that the surrounding diameter of the supporting element is more—but especially only slightly more—than the reduced diameter of the shank portion.

A design of the step at the beginning of the remainder of the thread of the threaded portion in which the step is rather big and in which the step starts suddenly is advantageous. The preferred design is to arrange the step at the place where the thread runout is connected to the thread portion. However, the step may also be arranged in the beginning portion of the thread portion, it is possible to arrange the step within the primary thread runout such that the step itself is located on a comparatively smaller outer diameter compared to the outer diameter of the thread of the threaded portion.

In all cases, it is preferred that the novel screw includes a stop or an inclination element which extends over a part of the circumference, and which cooperates with the narrowing location of the supporting element in an axial direction.

The increasing element or step may be designed and arranged to cover less than approximately 180° of the circumference of the thread runout. Preferably, the step is designed and arranged to cover approximately 90° of the circumference of the thread runout. When the step is designed to extend in a radial direction—meaning a direction perpendicular with respect to the longitudinal axis of the screw—there is a sectional surface of the surrounding cylinder with respect to the respective thread convolution of approximately 90° of the circumference. The thread convolution of the thread runout or of the thread is not removed in this region. Consequently, the outer diameter increases and enlarges in a tangential direction. In the case of threads including a plurality of convolutions, there is a plurality of smaller sectional surfaces. The remainder of the inclined thread convolution of the thread runout preferably extends over less than 180°.

The thread runout of the threaded portion of the screw may be produced by removing material or without removing material. It is especially advantageous to roll the thread runout facing the head of the screw down to the rolling diameter of the shank portion. Rolling means that masses only have to be deformed and moved instead of being removed. Consequently, when great deformation is desired—especially when deforming the screw to reach the rolling diameter or even less than the rolling diameter—the length of the screw is increased. However, there are no negative effects. In the case of removing material—for example by turning on a lathe or by grinding—it is easily possible to reduce the diameter to reach the rolling diameter. When the screw is deformed by cold forming without removing chips, it is even possible that the screw in the region of the removed thread runout includes an enlarged portion formed by rolling. In this case, the enlarged portion functions as the counter supporting surface for the narrow locations of the supporting element. In this way, they form the increasing element being arranged in the region of the thread runout instead of at its end. However, the attained effect is similar to the above described constructions. The continuous enlarging element may also be produced by removing chips.

When the supporting element is designed as a bush, the inner diameter of the bush may be more than the outer diameter of the threaded portion. A plurality of impressions may be located about the circumference of the bush in a spaced apart manner, as it corresponds to the number of convolutions of the thread. Usual threads only include one convolution. However, screws including threads having more than one convolution are also used in the art. The number of spaced apart impressions preferably is more than the number of convolutions of the thread to ensure that at least one of the impressions contacts the step in each relative position between the supporting element and the screw. When the step extends over approximately 90° of the circumference, it is preferred to use at least five impressions spaced apart about the circumference. When the step extends over approximately 180° of the circumference, it is preferred to use at least three impressions spaced apart about the circumference to ensure that at least one impression contacts the step in all relative positions.

When the supporting element is designed as a plain washer, the plain washer may have an inner diameter which is less than the outer diameter of the threaded portion to form the narrowing place In such a case, it is not necessary to arrange separate impressions or other counter surface elements.

There are a number of different possibilities of arranging the step-like increasing element. The design may be chosen in a way that the increment of the surrounding diameter towards the outer diameter of the threaded portion is located in the region of the threaded portion. The step-like increasing element may also be located at the transition location between the thread runout and the thread of the threaded portion. Furthermore, it is possible to chose the thread runout to have a comparatively shorter axial extension.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention, in the drawings, like reference numerals designate corresponding parts throughout the several views.

FIG. 8 is a semi-cut view of a prior art screw having a conventional end of the thread and a diagram illustrating the changes in diameter over the length of the screw.

FIG. 9 is a semi-cut view of a novel screw having a conventional end of the thread and a diagram illustrating the changes in diameter over the length of the screw.

DETAILED DESCRIPTION

Figure 1:
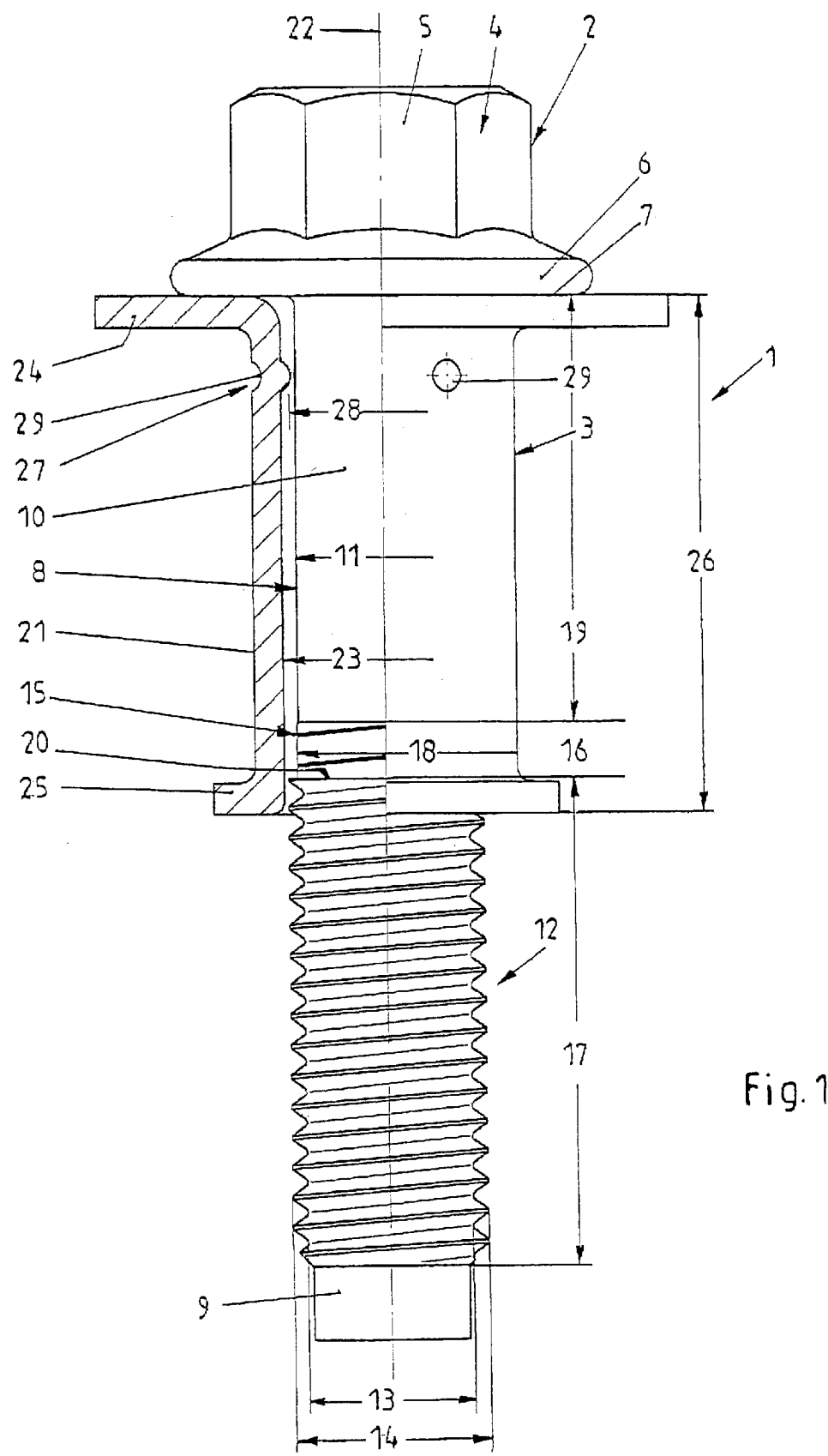
FIG. 1 is a partly sectional lateral view of a first exemplary embodiment of the novel connecting element.

Referring now in greater detail to the drawings, FIG. 1 illustrates a first exemplary embodiment of the novel screw connector 1. The screw connector functions as a connecting element and includes at least two elements. The screw connector 1 includes a screw 2 and a supporting element 3, In the illustrated exemplary embodiment of the novel screw connector 1, the screw 2 is designed as a collar screw. The screw 2 includes a head 4 having a noncircular engagement surface 5 for a torsional tool for operating the screw and a collar 6 including a surface 7 serving to transmit an axial force—A shank 8 is located close to the head 4 and to the surface 7, respectively. The shank 8 extends up to a free end 9 of the screw 2. The shank 8 at the free end 9 may be designed as a centering element. The shank 8 at the side facing the head 4 of the screw 2 has a portion 10 having a diameter 11 which is less than the diameter of the thread to be described hereinafter. The shank 8 at its side facing the free end 9 of the screw 2 includes a threaded portion 12. The thread of the threaded portion 12 includes a core diameter 13 and an outer diameter 14. An end of the thread or a thread runout 15 extends between the portion 10 of the shank 8 (which has the diameter 11 being reduced compared to the outer diameter 14 of the threaded portion 12) and the threaded portion 12. This is the end of the thread which faces the head 4 of the screw 2. The end of the thread 15 extends over a length 16 in a longitudinal direction of the screw 2. The threaded portion 12 and a thread runout facing the free end 9 have a length 17.

It is already to be seen from FIG. 1 that the end of the thread 15 has an envelope diameter 18 or a surrounding diameter. While thread runouts known in the prior art have a conical design at this place—meaning an envelope cone—the novel connecting element 1 includes a thread runout 15 which has an at least approximately cylindrical design. In other 5 words, the thread runout 15 has a surrounding diameter 18 being approximately constant over the length 16. The surrounding diameter 18 is in the range of the reduced diameter 11 of the shank portion 10. However, the surrounding diameter 18 may also be slightly more or less than the diameter 11 The shank element 10 extends over a length 19 between the surface 7 of the head 4 of the screw 2 and the beginning of the end of the thread 15 facing the head 4 of the screw 2. In this way, the diameter (outer diameter) suddenly increases at the transition between the end of the thread 15 and the outer diameter 14 of the threaded portion 12 to form a step 20.

The exemplary embodiment of the supporting element 3 in FIG. 1 is designed as a bush 21. The bush 21 approximately has the design of a hollow cylinder with respect to the axis 22 of the screw 2, and it includes an inner diameter 23. In the illustrated exemplary embodiment, the inner diameter 23 is more than the outer diameter 14 of the threaded portion 12 such that the bush 21 after producing the thread at the threaded portion 12 on the screw 2 may be pushed onto the screw 2 and onto its shank 8, respectively. The bush 21 at its ends may include flanges 24 and 25 protruding in a radial direction. The bush 21 has a length 26 extending in an axial direction—meaning parallel with respect to the axis 22. Usually, the length 26 is more than the sum of the lengths 16 and 19 such that the bush 21 ends in the region of the thread runout 15. However, the length 26 may also be designed to be shorter when over screwing of the threaded portion 12 is possible or desired. Due to the coordination of diameters, the bush 21, may be rotated with respect to the screw 2. The supporting element 3 includes a narrow location 27 forming a diameter 28. The diameter 28 is less than the outer diameter 14 of the threaded portion 12. The narrow location 27 may be formed by a plurality of impressions 29 which are produced after rolling the thread of the threaded portion 12 and after inserting the bush 21 onto the screw 2. However, the narrow location 27 may also be designed and produced in a different way, for example, by a continuous enlarged portion protruding towards the inside, by a securing ring and the like.

Figures 2, 3:
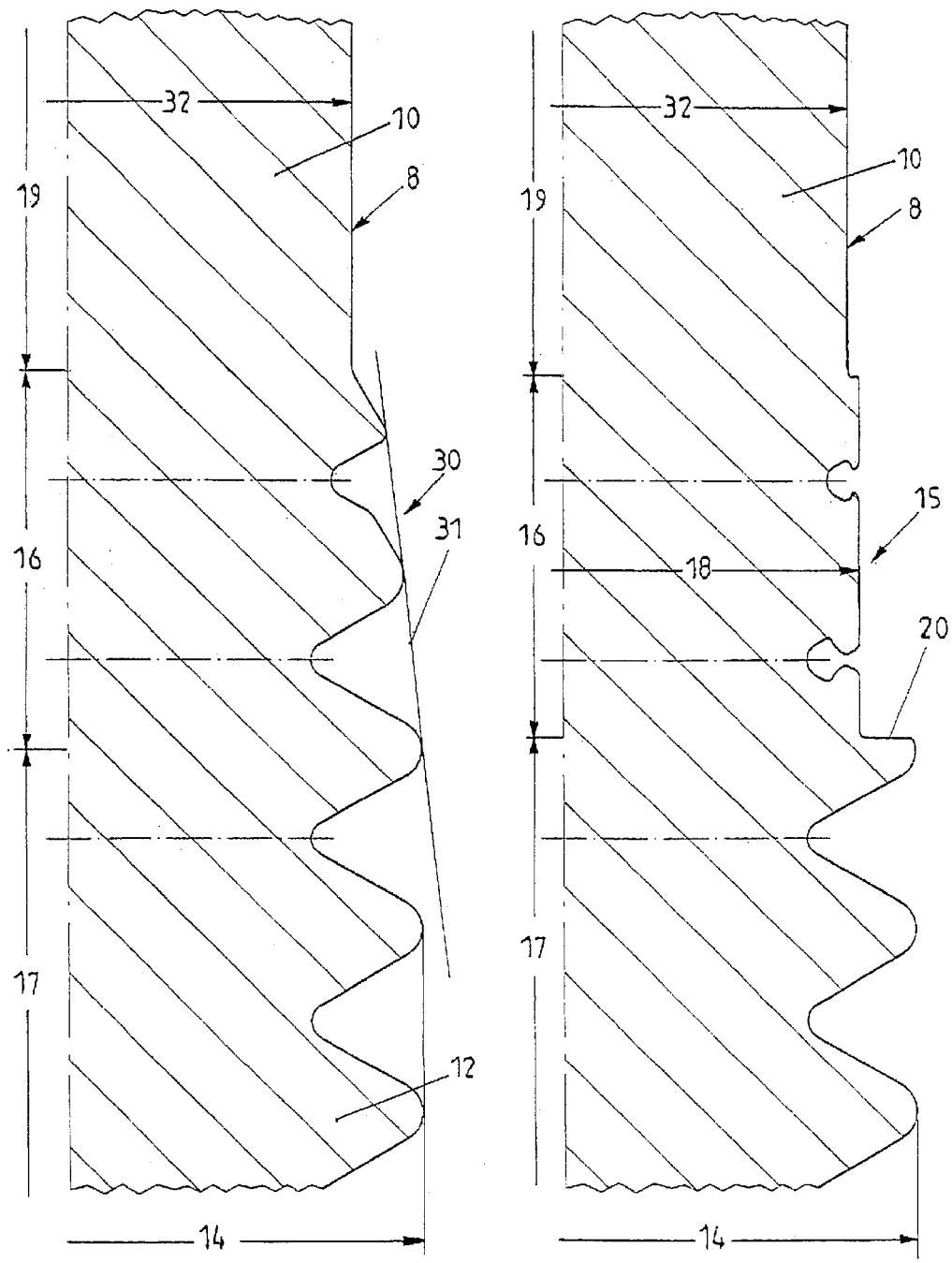
FIG. 2 is an enlarged semi-cut view of the end of a thread as known in the prior art.
FIG. 3 is an enlarged view of the novel end of a thread in comparison with the prior art thread as shown in FIG. 2.

The design of the novel thread runout 15 is different than designs known in the prior art. The differences may be well seen from a comparison of FIGS. 2 and 3. FIG. 2 (prior art) illustrates an enlarged section (as a semi-sectional view) of a known screw 2 with a conventional thread runout 30 extending over the length 16. The conventional thread runout 30 is located between the shank portion 8 and the threaded portion 12. The thread of the threaded portion 12 ends in the thread runout 30. The outer diameter is limited by an imaginary surrounding cone 31. The diameter of the thread runout 30 increases over the length 16. For example, the diameter starts at the rolling diameter 32, and it ends at the outer diameter 14 of the threaded portion 12. Usually, the length 16 corresponds to 2,5 rotations of the respective thread. In a short design, it corresponds to 1.25 rotations of the thread.

Compared to the prior art screw as known from FIG. 2, FIG. 3 illustrates the novel design of the thread runout 15. The thread runout 15 extends over the length 16. In a first step, the thread runout 15 may be produced as it is known from the prior art (FIG. 2). Then, the surrounding diameter 18 is produced in the region of the thread runout 15. The surrounding diameter 18 has the shape of a cylinder, and it extends over the length 16. The surrounding diameter 18 may be produced by removing material or without removing material.

FIG. 3 illustrates an exemplary embodiment in which the surrounding diameter 18 has been produced without removing material by rolling in a way that parts of the thread impressions in the region of the thread runout 15 may still be seen in FIG. 3. The end of the surrounding diameter 18 facing away from the head 4 of the screw 2 may coincide with the end of the thread runout 15. However, it may also end before or after the end of the thread runout 15. However, the novel connecting element 1 includes the step 20. The step 20 may also be called a step-like inclining element 20 or a stop element. The step 20 is located in the region of the thread runout 15, or it may also be located within the threaded portion 12 in case it is not located at the location of transition. The surrounding inner diameter 18 is only slightly different compared to the rolling diameter 32. In the illustrated exemplary embodiment, the surrounding diameter 18 is designed to be slightly more than the rolling diameter 32. The surrounding diameter 18 substantially differs from the outer diameter 14 of the threaded portion 12 in a way that the step 20 is rather big in a radial direction. The step 20 forms a stop cooperating with the narrow location 27 of the supporting element—3. It is designed and arranged to assure the captive arrangement of the supporting element at the screw 2, and to prevent clamping of the elements with respect to one another.

Figure 4:
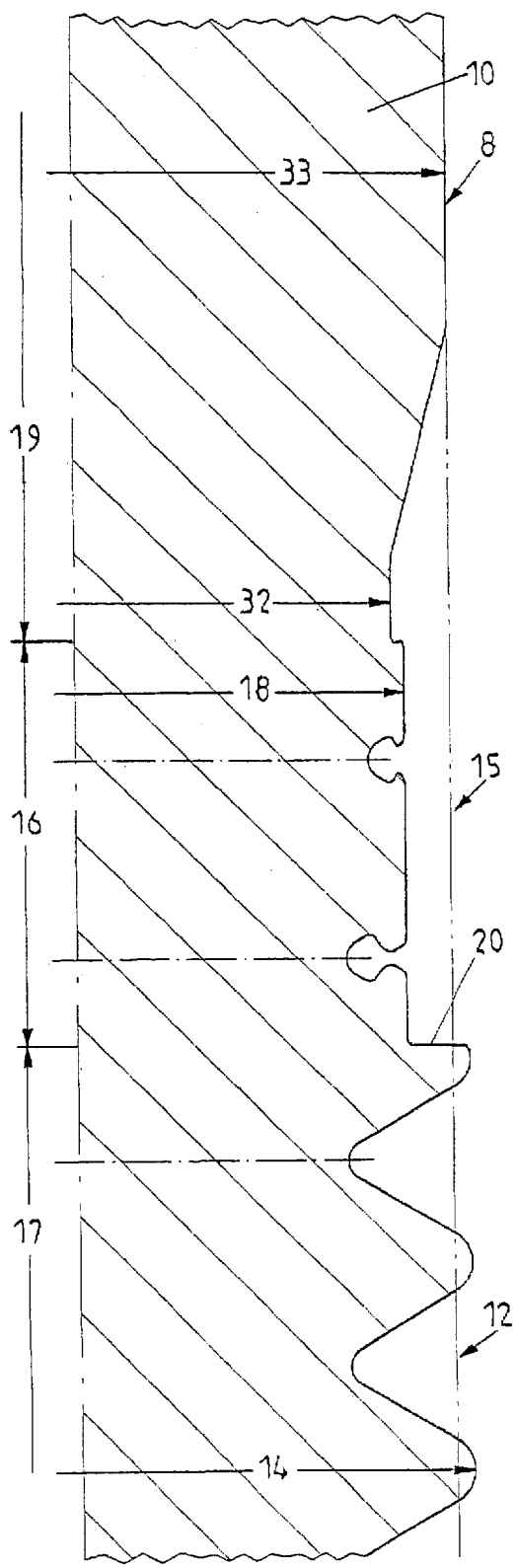
FIG. 4 is a semi-cut view of another exemplary embodiment of the novel end of the thread.

FIGS. 4 through 7 illustrate further exemplary embodiments of the novel thread runout 15. FIG. 4 illustrates an exemplary embodiment in which the shank portion 10 of the shank 8 has a diameter 33 being more than the roiling diameter 32. The diameter 33 is slightly less than the outer diameter 14 of the threaded portion 12. This exemplary embodiment may also be produced by cold forming (for example by rolling), but also by a process including a plurality of steps, for example a milling process which removes material.

Figure 5:
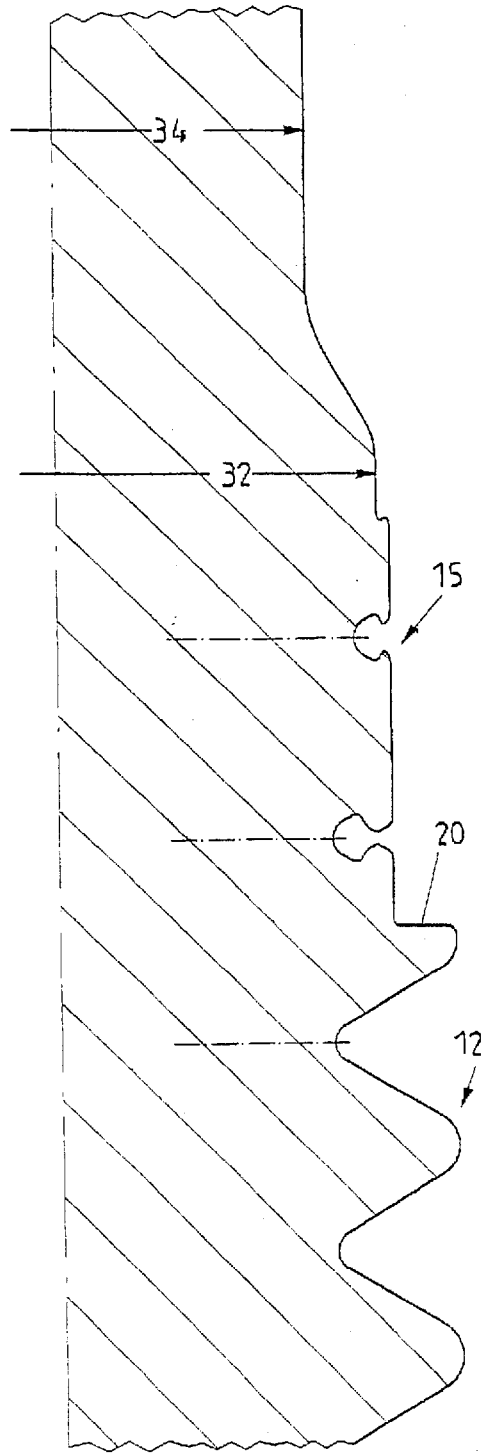
FIG. 5 is a semi-cut view of another exemplary embodiment of the novel end of the thread.

The exemplary embodiment of FIG. 5 makes it clear that the arrangement may also be different than illustrated in FIG. 4. The diameter 34 is less than the rolling diameter 33. The thread runout 15 has been produced with or without removing material. The above described exemplary embodiments include the element 20 being located more or less at the transition between the thread runout 15 and the thread of the threaded portion 12.

Figure 6:
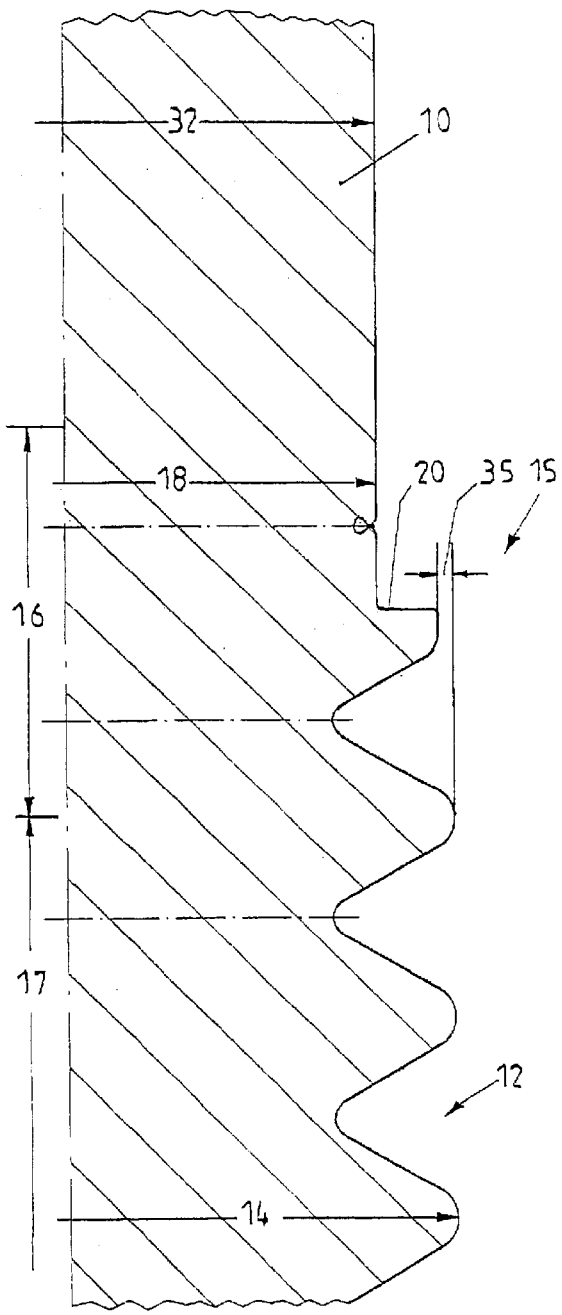
FIG. 6 is a semi-cut view of another exemplary embodiment of the novel end of the thread.

FIG. 6 illustrates another exemplary embodiment of the novel connecting element 1 in which the process area of the thread runout 15 ends within the length 16. The element 20 has a design which is slightly smaller in a radial direction, and it is located at a place of the thread of the thread runout 15. The radial extension with respect to the outer diameter 14 of the threaded portion 12 is less by a distance 35. However, the element 20 is sufficient to fulfill its functions. This especially applies when the diameter 18 is identical or at least approximately identical to the rolling diameter 32.

Figure 7:
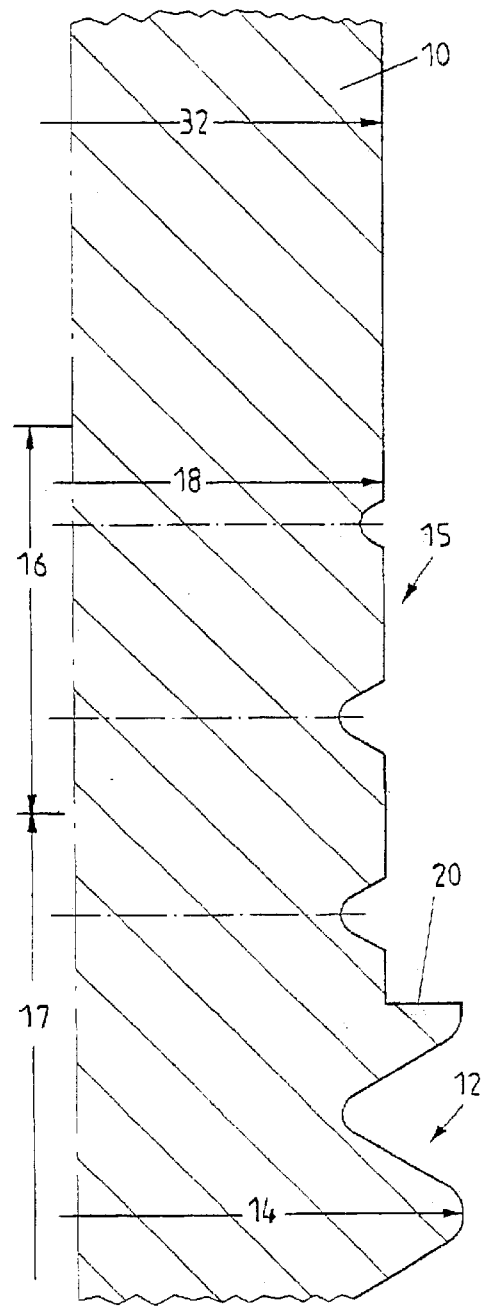
FIG. 7 is a semi-cut view of another exemplary embodiment of the novel end of the thread.

FIG. 7 shows the possibility of designing the axial extension of the later processed portion of the thread runout 15 in a way that the step 20 is located in the region of the length 17 of the thread of the threaded portion 12—meaning outside the length 16 of the thread runout 15. In this way, the step 20 extends in a way to reach the outer diameter 14 of the thread of the threaded portion 12. The maximum is also reached when the step 20 is located exactly at the transition between the lengths 16 and 17. The exemplary embodiments as explained with reference to FIGS. 6 and 7 may be produced by processes removing material (FIG. 7} or not removing material (FIG. 6} in the region of the thread runout 15.

FIG. 8 is similar to FIG. 2, and it also illustrates the screw 2 as known from the prior art as a semi-section and an associated diagram illustrating the diameter starting from the rolling diameter 32 in the region of the shank portion 10, the diameter in the region of the end of the thread 30 to the outer diameter 14 in the region of the threaded portion 12. It is to be seen that the diameter in the region of the end of the thread 30 increases over the length 16, as it corresponds to the surrounding cone 31.

FIG. 9 illustrates the general design of the novel thread runout 15 with the step 20. Starting from the shank portion 10—which may have a rolling diameter 32—the surrounding 20 diameter 18 in the end of the thread 15 is located slightly higher, and it then suddenly changes over the length 1 of the screw 2 at the step 20 to reach the outer diameter 14. The comparison of FIGS. 8 and 9 relates to the longitudinal direction of the screw 2.

Figure 10:
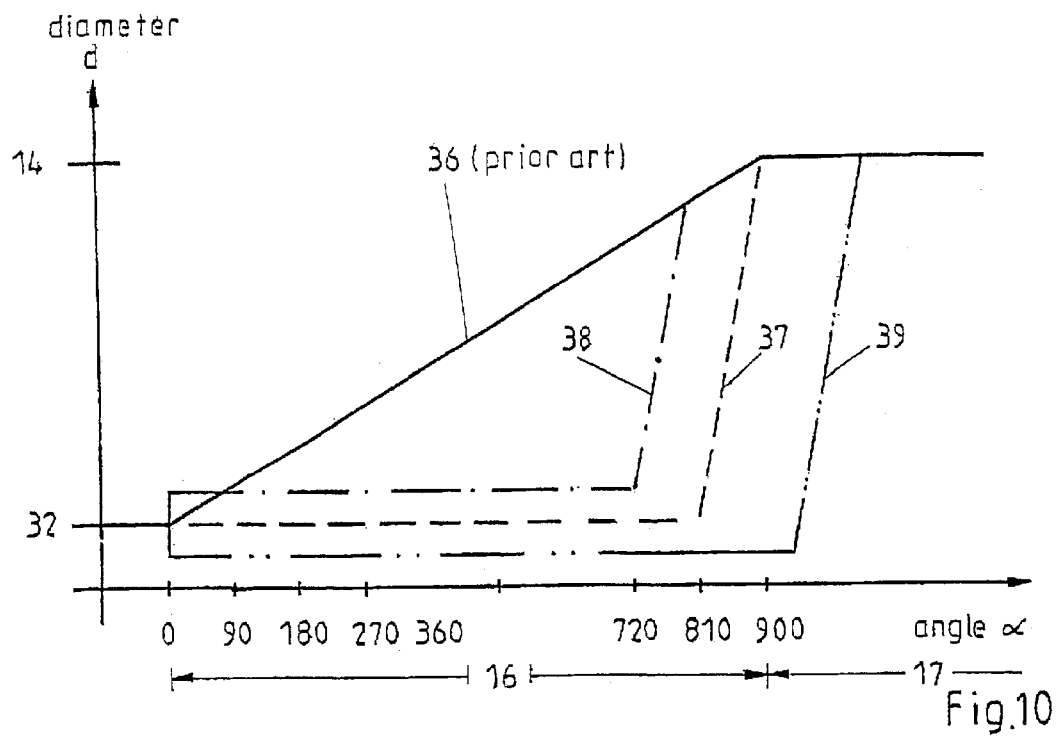
FIG. 10 is a diagram of the increase in diameter of the end of the thread in a tangential direction following the helical line.

FIG. 10 illustrates the relationship of the winding down the circumference of the screw 2—meaning in a tangential direction along the helical line of the thread. For this purpose, one axis of the diagram relates to the angle alpha, and the other axis indicates the diameter d. The angle alpha and the diameter d are illustrated with respect to the circumference of the screw 2. The continuous line 36 relates to a prior art screw including a thread runout 30 of conventional design. It is to be seen from FIG. 10 that the tip of the thread has an enlarging diameter which extends over a total of 900°. The line 36 forms a very flat inclined plane. In the prior art showing line 36—especially when using single impressions 29—there is the danger of the 5 inwardly directed tip of an impression 29 clamping between two threads of the thread runout 30. It is also possible that clamping occurs at the tips of the threads. The dashed line 37 indicates the design of a novel thread runout 15. The novel thread runout 15 or end of the thread 15 with its envelope diameter or surrounding diameter 18 first maintains the rolling diameter 32. The inclination element 20 is located in the transition region between the thread runout 15 and the thread of the threaded portion 12. The comparatively strong inclination of the outer diameter covers an angle of approximately 90°. The dash-dotted line 38 illustrates another exemplary embodiment of the novel connecting element in which the surrounding diameter 18 first is slightly more than the rolling diameter 32, and then extends over most part of the length 16 of the thread runout 15. The inclination element 20 is located in the region of the length 16. The strong inclination also covers a region of approximately 90°. The line 39 including double points illustrates an embodiment in which the surrounding diameter 18 is less than the rolling diameter 32. Furthermore, the step 20 is located in the region of the thread of the threaded portion 12—meaning outside the primary thread runout 15.

Figure 11:
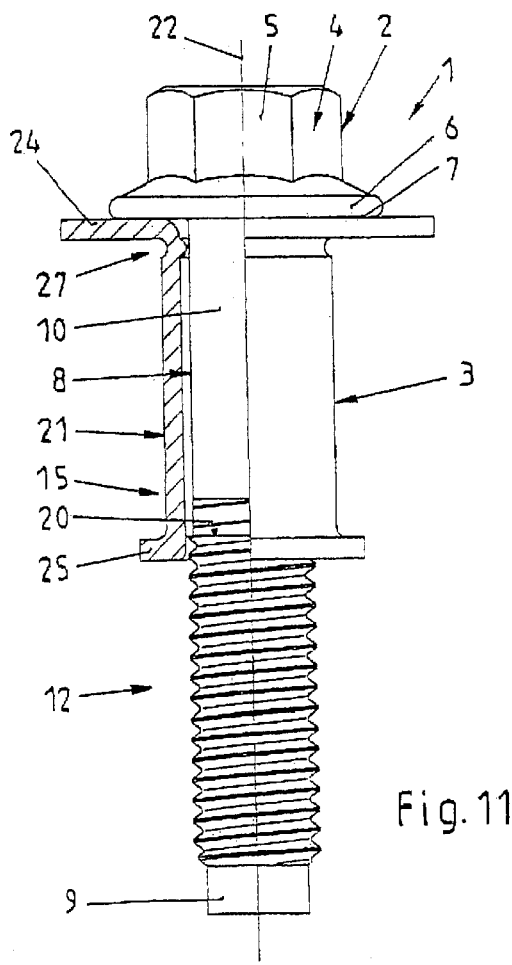
FIG. 11 is a lateral view of another exemplary embodiment of the novel connecting element.

FIG. 11 illustrates another exemplary embodiment of the novel connecting element 1 similar to the embodiment of FIG. 1. The supporting element 3 is also designed as a bush 21. The narrowing location 27 is formed by an infinite number of impressions 29—meaning an enlarging element 40 being deformed towards the inside. The thread runout 15 may have the same design as this has already been described with respect to the other exemplary embodiments of the novel connecting element 1.

Figure 12:
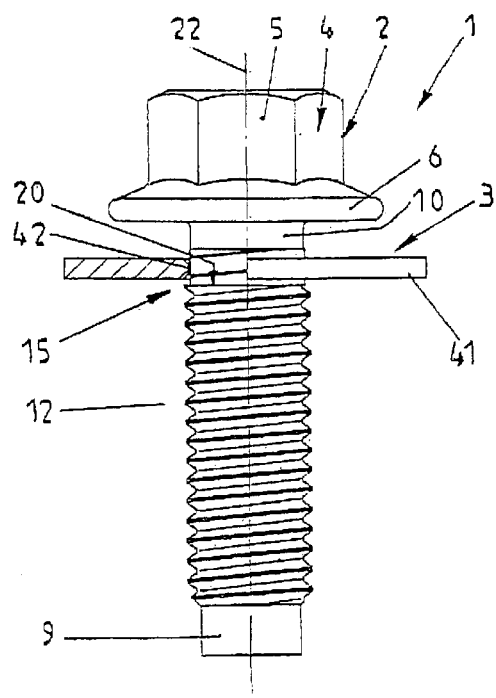
FIG. 12 is a lateral view of another exemplary embodiment of the novel connecting element.

FIG. 12 illustrates an exemplary embodiment of the novel connecting element 1 in which the supporting element 3 is designed as a plain washer 41. The plain washer 41 has an inner diameter 42 which forms the narrowing location 27. The shank portion 10 has a comparatively short design, and it immediately verges into the thread runout 15. Again, the step 20 cooperates with the inner diameter 42. It is to be understood that the thread of the threaded portion 12 is produced after having mounted the plain washer 41. The same applies to the respective processing step taking place in the region of the thread runout 15. Processing of the thread runout 15 is possible since the plain washer 41 has a thickness which is less than the length of the shank portion 10.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A connecting element, comprising:
    a screw and a supporting element,
        said screw including a head and a shank,
        said shank having opposed ends, said head formed on one end of said shank, a threaded portion having an outer diameter, and a shank portion positioned between said head and said threaded portion, said shank being of smaller diameter than the outer diameter of said threaded portion, and a radially extending step positioned between said threaded portion and
    said shank portion,
    said threaded portion including a thread runout facing said head, said thread runout having an axial extension and a circumference,
    at least a portion of said thread runout being reformed to leave at least a partial deformed thread to form—said step, said step having an outer diameter which approximately corresponds to the outer diameter of said threaded portion; and
    said supporting element being captively connected to said screw and including a narrowing location having a diameter which is less than the outer diameter of said threaded portion and less than the outer diameter of said step such that said step forms a stop for said supporting element to prevent said supporting element from moving off said shank.

2. The connecting element of claim 1, wherein said screw in the region of said reformed thread runout has a surrounding diameter which has an approximately cylindrical shape in an axial direction.

3. The connecting element claim 2, wherein the surrounding diameter is less than the diameter of said narrowing location.

4. The connecting element of claim 3, wherein the surrounding diameter is more than the diameter of said shank portion.

5. The connecting element of claim 3, wherein the surrounding diameter is slightly more than the diameter of said shank portion.

6. The connecting element of claim 1, wherein said step extends less than approximately 180° about the circumference of said shank.

7. The connecting element of claim 1, wherein said step extends approximately 90° about the circumference of said shank.

8. The connecting element of claim 1, wherein said step is characterized by having been produced by removing material.

9. The connecting element of claim 1, wherein said step is characterized by having been produced without removing material.

10. The connecting element of claim 1, wherein said step is characterized by having been produced by rolling.

11. The connecting element of claim 1, wherein said supporting element is designed as a bush having an inner diameter which is more than the outer diameter of said threaded portion, and wherein said bush includes a plurality of impressions being spaced apart about the circumference.

12. The connecting element of claim 11, wherein said thread of said threaded portion has a number of convolutions extending about the shank, and wherein the number of said impressions of said bush is more than the number of said convolutions.

13. The connecting element of claim 1, wherein said supporting element is designed as a plain washer having an inner diameter which is less than the outer diameter of said threaded portion, the inner diameter forming said narrowing location.

14. The connecting element of claim 1, wherein said step is arranged in the region of said threaded portion.

15. A connecting element, comprising:

a screw and a supporting element,
   said screw including a head and a shank, said shank having opposed ends, said head formed on one end of said shank, a threaded portion formed along the other end of said shank, a shank portion positioned between said head and said threaded portion, and a step positioned between said threaded portion and said shank portion,
   said threaded portion having an outer diameter and including a thread runout facing said shank portion, said thread runout having an axial extension and a circumference,
   said shank portion having a diameter which is less than the outer diameter of said threaded portion,
   at least a portion of said thread runout being reformed to leave at least a partial deformed thread to form said step said step having an outer diameter which approximately corresponds to the outer diameter of said threaded portion, and said screw in the region of said reformed thread runout has a surrounding diameter which has an approximately cylindrical shape and which is less than the diameter of said threaded portion; and
   said supporting element being captively connected to said screw and including a narrowing location having a diameter which is less than the outer diameter of said threaded portion and less than the surrounding diameter such that said step forms a stop for said supporting element.

16. The connecting unit of claim 15, wherein said stop element extends about less than approximately 180° of the circumference of said shank.

17. The connecting unit of claim 15, wherein said stop element extends about approximately 90° of the circumference of said shank.

18. The connecting unit of claim 15, wherein said stop element is arranged in the region of said threaded portion.

19. A connecting unit, comprising:

a screw including a head and a shank, said shank having an end and including a shank portion, a threaded portion and a stop element,
   said threaded portion having an outer diameter and including a thread end facing said head, said thread end having an axial extension and a circumference,
   said shank portion having a diameter which is less than the outer diameter of said threaded portion,
   said stop element characterized by having been produced by removing said thread end at least over a part of the axial extension and of the circumference of said thread end to leave at least a partial deformed thread in a way that said stop element has an outer diameter which approximately corresponds to the outer diameter of said threaded portion and that said screw in the region of said removed thread end has a surrounding diameter which has an approximately cylindrical shape; and
a supporting element being connected to said screw and including a narrowing location having a diameter which is less than the outer diameter of said threaded portion and greater than the surrounding diameter such that said stop element contacts said supporting element to prevent further movement of said supporting element in a direction away from said head of said screw, said narrowing location being designed and arranged to cooperate with said stop element to prevent unintentional removal of said supporting element from said screw.

* * * * *